United States Patent [19]

Johansson

[11] Patent Number: 5,345,487
[45] Date of Patent: Sep. 6, 1994

[54] SPACER CAPTURE METHOD FOR RECTILINEAR SECTIONED WATER RODS

[75] Inventor: Eric B. Johansson, Wrightsville Beach, N.C.

[73] Assignee: General Electric Company, San Jose, Calif.

[21] Appl. No.: 55,479

[22] Filed: May 3, 1993

[51] Int. Cl.$^5$ ................................................. G21C 3/34
[52] U.S. Cl. .................................. 376/444; 376/438; 376/442
[58] Field of Search ................. 376/444, 441, 442, 438

[56] References Cited

U.S. PATENT DOCUMENTS

| | | | |
|---|---|---|---|
| 3,350,276 | 10/1967 | Warberg et al. | 376/442 |
| 4,664,882 | 5/1987 | Doshi | 376/444 |
| 4,692,303 | 9/1987 | Osborne | 376/442 |
| 4,999,153 | 3/1991 | Johansson et al. | 376/444 |
| 5,024,807 | 6/1991 | Hatfield et al. | 376/442 |
| 5,149,495 | 9/1992 | Elkins | 376/444 |
| 5,174,949 | 12/1992 | Johansson | 376/444 |
| 5,209,899 | 5/1993 | Johansson et al. | 376/442 |

FOREIGN PATENT DOCUMENTS 2216088 8/1990 Japan ................................. 376/442

Primary Examiner—Behrend E. Harvey
Attorney, Agent, or Firm—J. S. Beulick

[57] ABSTRACT

A rectilinear sectioned water rod—preferably of square cross-section—is provided with horizontal grooves for keying to bands on the inner, water rod surrounding aperture of spacers. Each spacer is constructed preferably of Inconel and includes a specialized inner band for keying to the water rod. The inner spacer member includes an upper surrounding band, a lower surrounding band, and four connecting vertical members—one positioned at each corner of the water rod. Two adjacent vertical members are bent inward to contact one side of the water rod at spaced apart points on the corners of the water rod. The remaining two adjacent vertical members are bent inward to contact the remaining two corners at single points on each vertical member. There results a six point contact between the inner band of the spacer and the water rod with four contact points on one side of the water rod aligning the spacer normal to the water rod and the remaining two points firmly biasing the spacer into its normal relationship with respect to the water rod. An over center spring member extends between two of the vertical members—preferably those two members having the four stops configured thereon. This over center spring is maintained outwardly and away from the water rod during insertion of the spacer over the water rod. When the spacer is located overlying its respective horizontal locating groove, the spring is manually tipped from its over center disposition to contact the water rod and lodge within the horizontal groove.

4 Claims, 5 Drawing Sheets

SPACER CAPTURE METHOD FOR RECTILINEAR SECTIONED WATER RODS

This invention relates to the fabrication of nuclear fuel bundles for boiling water nuclear reactors. More particularly, in a nuclear fuel bundle having a rectilinear sectioned water rod—preferably square—an inside band and spring for a spacer are disclosed which enable the spacer to firmly attach to the water rod. Assembly of the fuel bundle can easily follow from the disclosed attachment of the water rod and spacers.

BACKGROUND OF THE INVENTION

In nuclear fuel bundles for boiling water reactors, assembly of the fuel bundle usually occurs around the water rods associated with such fuel bundles. To set the stage for this invention, the construction and operation of such a fuel bundle will first be summarily set forth. Second, the function of the large central water rod will briefly be delineated. Finally, the construction of the "tree" consisting of the spacers and the large central water rod will be discussed.

Nuclear fuel bundles for boiling water nuclear reactors typically include a lower tie plate for supporting a matrix of upstanding fuel rods of the bundle and for admitting water. An upper tie plate is secured to the other end of the fuel rods and enables the water and generated steam to exit the fuel bundle. Since the fuel rods are long and slender, they must be braced intermittently with respect to the tie plates. This being the case, normally seven so-called spacers are placed between the upper and lower tie plates. These spacers individually surround each fuel rod at the elevation of each spacer to prevent the fuel rods from abrading contact during the generation of steam and to maintain the design clearances between the fuel rods during bundle operation.

Typically, fuel bundles include large, central water rods. These water rods exceed by many times the diameter of the fuel rods and have for their main purpose the introduction of moderating water into the upper two phase region of the fuel bundle. Specifically, and during the generation of steam, the upper portion of a fuel bundle in a boiling water reactor has the steam fraction present in the fuel bundle predominate over the water fraction. This excess of steam renders the nuclear performance of the upper portion of the fuel bundle in a boiling water reactor deficient; more moderating water is needed in the upper two phase region of the fuel bundle for efficient nuclear performance. Hence, it has become a common practice to insert large central water rods.

These large central water rods attach at the lower tie plate, and communicate pure water from the lower portion of the fuel bundle to the upper portion of the fuel bundle. Thus, the water rods supply needed moderator to the upper two phase region of the fuel bundle.

As large central water rods have found their way into almost all boiling water nuclear fuel assembly designs, they have also entered into the construction of such fuel bundles. In the assembly of such fuel bundles, the spacers are first attached to the large water rods and registered at their respective water rod surrounding apertures to form a "tree" configuration. Thereafter, the individual fuel rods are threaded through the spacers at each successive fuel rod surrounding aperture to and towards one of the tie plates. The threaded rods pass successively through each rod aperture in each successive spacer until all such fuel rods are held firmly in place. Once all the fuel rods are in place, the remaining tie plate is attached and the fuel assembly—consisting of the tie plates, large central water rod, spacers, and fuel rods is ready for placement into the fuel channel.

Large central water rods are usually circular in cross-section; in the case under consideration here, the large central water rods are rectilinear in section—preferably square in cross-section.

SUMMARY OF THE INVENTION

A rectilinear sectioned water rod—preferably of square cross-section—is provided with horizontal grooves for keying to bands on the inner, water rod surrounding band of spacers. These horizontal grooves are vertically spaced on the water rod at the intended elevation of the respective spacers for keying to an over center spring on each spacer. Preferably, these vertically spaced grooves to not extend fully through the water rod.

Each spacer is constructed preferably of Inconel and includes a specialized inner band with an over center spring for keying to the water rod at the horizontal grooves. The inner spacer member includes an upper water rod surrounding band, a lower water rod surrounding band, and four connecting vertical members—one positioned at each of the four corners of the rectilinear sectioned water rod.

Two adjacent vertical members are each bent inward to each form paired vertically spaced apart stops. These two adjacent vertical members thus each contact one side of the water rod at a total of four spaced apart stops. These four spaced apart stops—with two stops on each vertical member—bear on the corners of one side of the water rod to maintain the water rod surrounding band of the spacer plumb with respect to the water rod.

The remaining two adjacent vertical members are bent inward to form biasing springs in contact the two remaining corners at single points. There results a six point contact between the inner band of the spacer and the water rod with four contact points on one side of the water rod aligning the spacer normal to the water rod and the remaining two points firmly biasing the spacer into its normal relationship with respect to the water rod.

An over center spring member extends between two of the vertical members—preferably those two members having the four stops configured thereon. This spring has two stable positions; in the first position it is bent away from the water rod, and in the second position it is bent towards the water rod. Prior to and during insertion of the water rod, the over center spring is in its first position, deflected away from the water rod. When the spacer is located with the spring overlying its respective horizontal locating groove, the spring is manually tipped from its first position to its second position to contact the water rod and lodge within the horizontal groove. There results a firm attachment of the spacer to the water rod, permitting the remainder of the assembly of the fuel bundle to readily proceed.

DESCRIPTION OF THE PREFERRED EMBODIMENT

Figure 1:
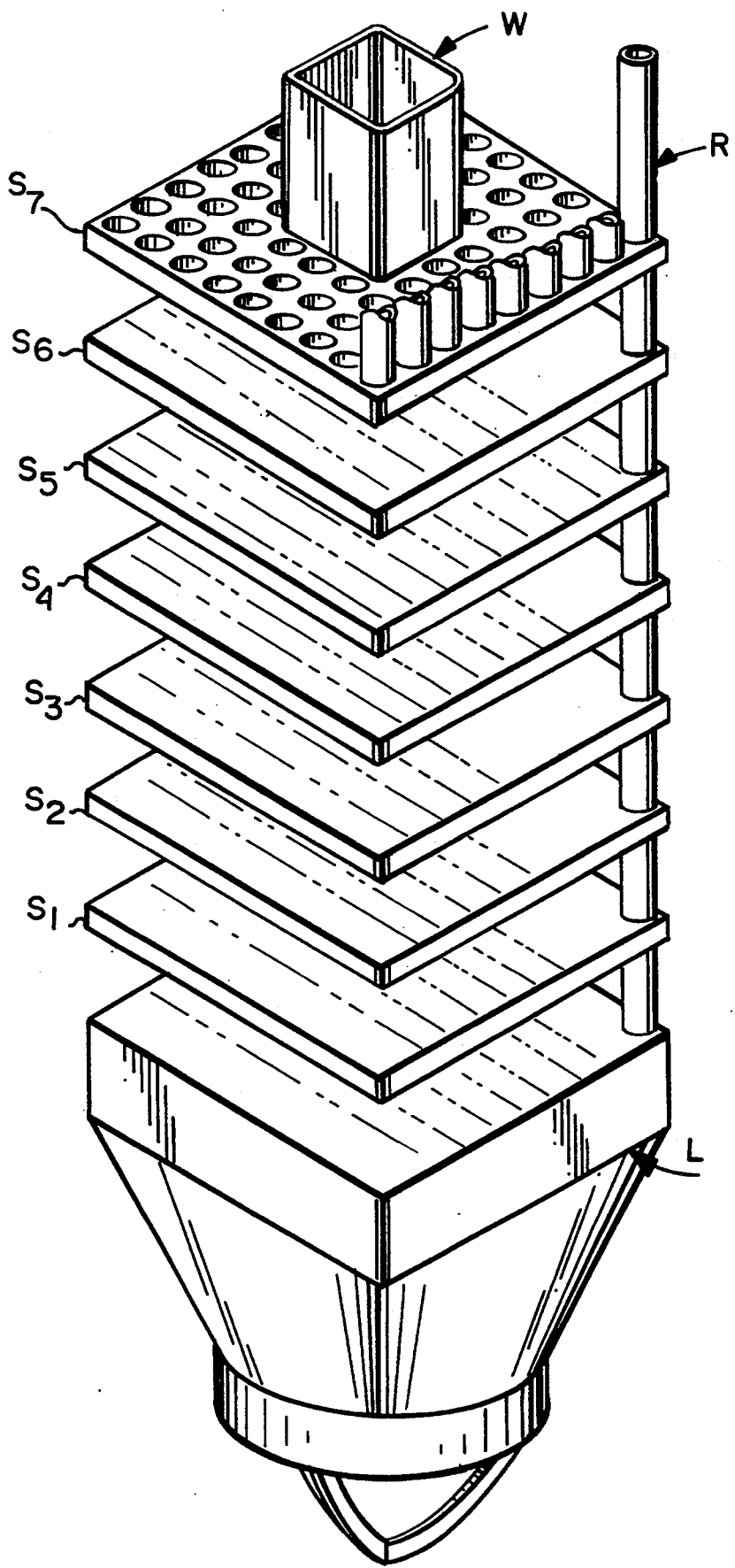
FIG. 1 is a perspective view of a rectilinear sectioned water rod—here shown with a square cross-section—having a tie plate attached at one end with seven spacers in place with the first of the fuel rods being threaded through the resulting "tree" assembly.

Referring to FIG. 1, a rectilinear sectioned water rod W—here shown square in section—is shown having seven spacers $S_1$–$S_7$ keyed to water rod W. Lower tie plate L is shown fastened to the bottom of the assembly. As all spacers are in place, a single fuel rod R is shown being threaded into place.

Figure 2:
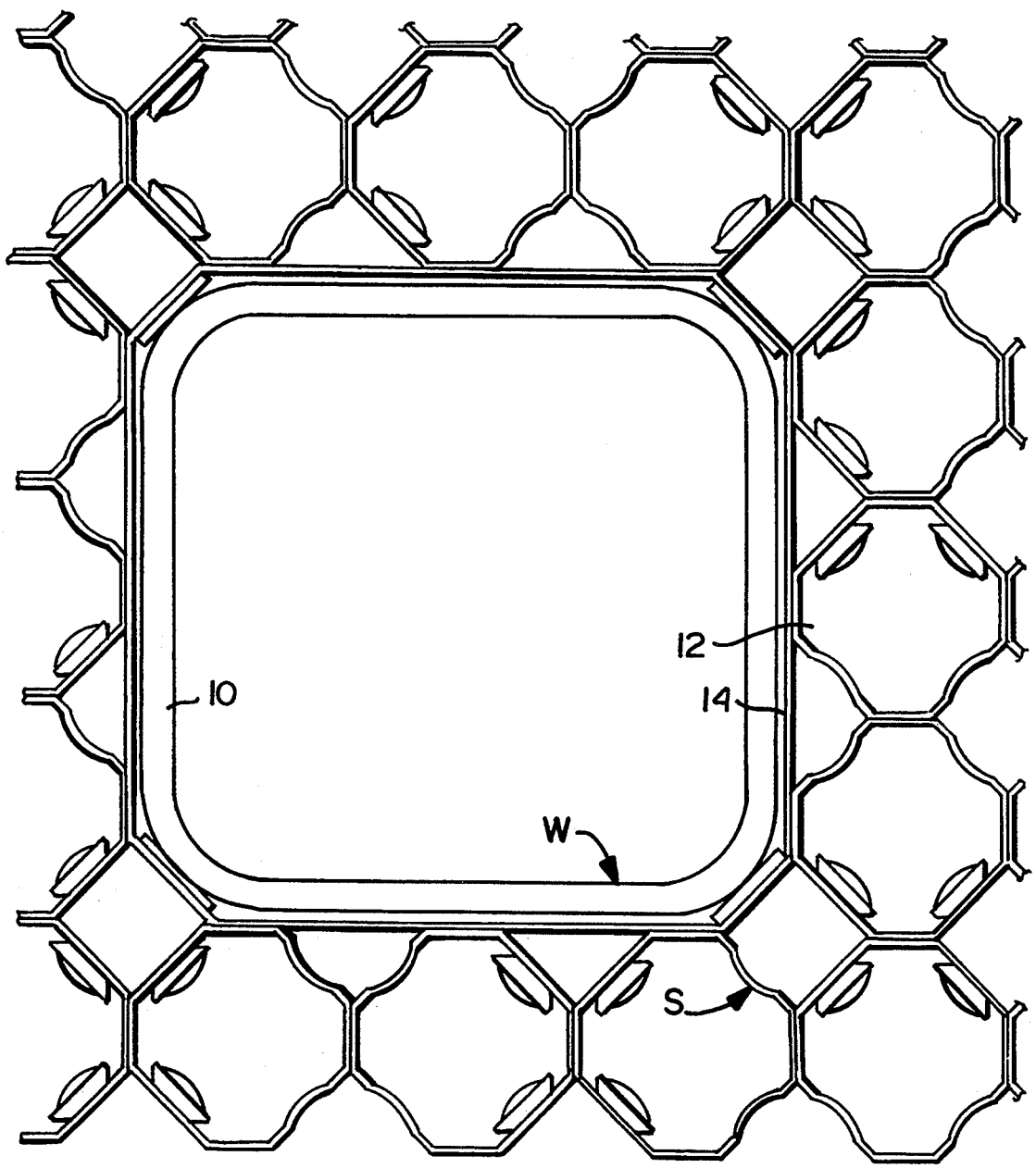
FIG. 2 is a partial cross-section of a spacer at the square sectioned water rod showing a profile of the upper and lower spacer inner band configuration at their points of contact with the water rod.

FIG. 2 is a section taken at the top of a spacer S. Water rod W is shown having a wall thickness 10 with band 14 surrounding the water rod. A typical spacer cell 12 is illustrated, the reader understanding that much of the spacer has been omitted. The method of locking is not shown in this view.

Figure 3:
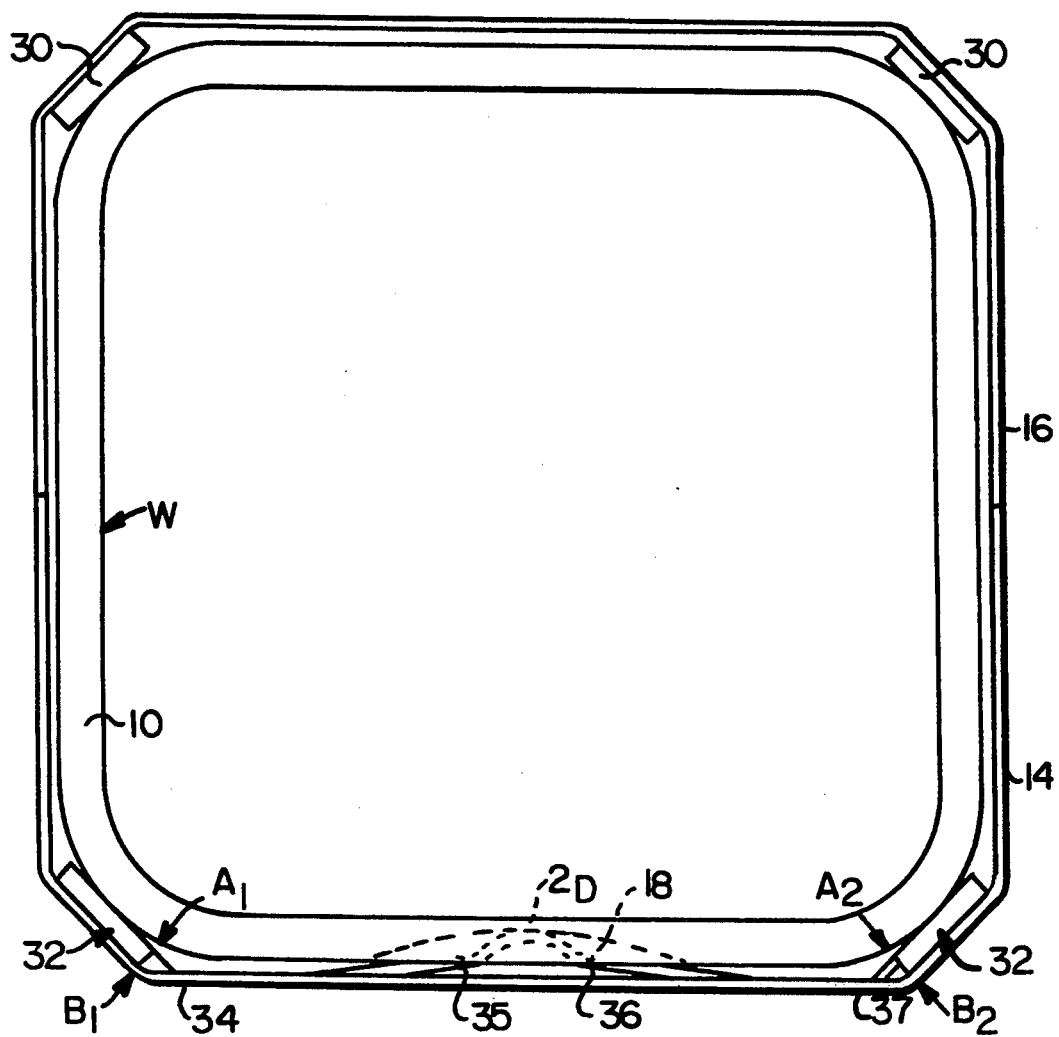
FIG. 3 is a partial cross-section of a spacer at the square sectioned water rod showing the profile of middle inner spacer band configuration at its point of contact with the water rod.

FIG. 3 is a section similar to FIG. 2 with the section be taken just above a locking groove 18 only partially penetrating the thickness 10 of water rod W. As can be seen, legs 30 appear at the upper portion of the figure; these legs spring bias the spacer band—and hence the spacer—into a right angle with respect to water rod W. Likewise, legs 32 appear at the lower portion of the figure; these legs contact the corners of water rod W, maintain band 14 at a right angle around the water rod W, and form the holding member for over center spring 20.

Figure 4:
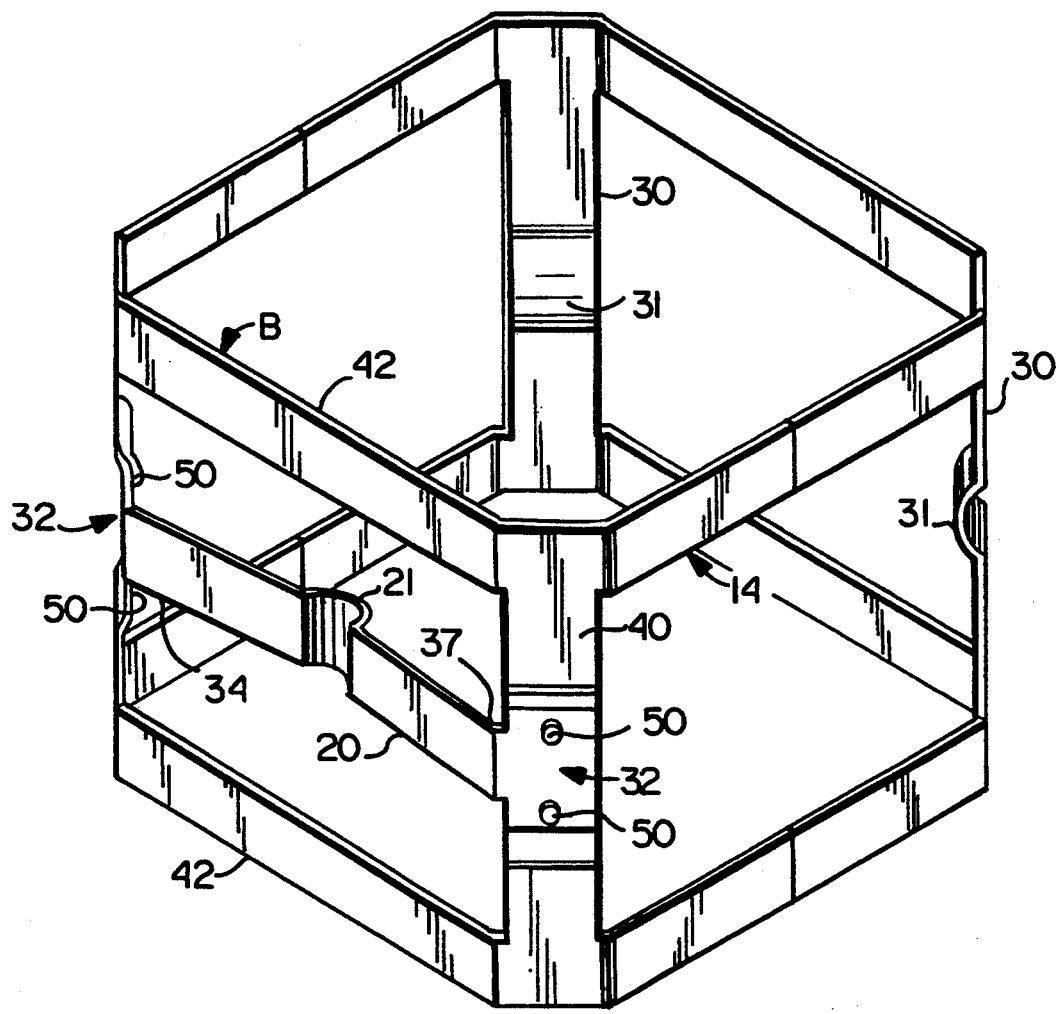
FIG. 4 is a perspective view of the inner spacer band for contacting the water rod with the remainder of the spacer omitted; and, FIGS. 5A and 5B are respective side elevation and plan cross-section of the water rod and inner spacer band illustrating the engagement of the spacer to the water rod at the illustrated horizontal groove.

FIG. 4 shows an isometric view of the band surrounding the water rod. The water rod is not shown. Vertical legs 30 act as springs which contact the water rod at dimples 31 and bias the water rod toward stops 50 on vertical legs 32. The over center spring 20 extends between vertical legs 32.

The over center spring 20 has an inwardly projecting central region 21 which fits into the locking groove 18, shown in FIG. 3 and FIG. 5.

Figure 5B:
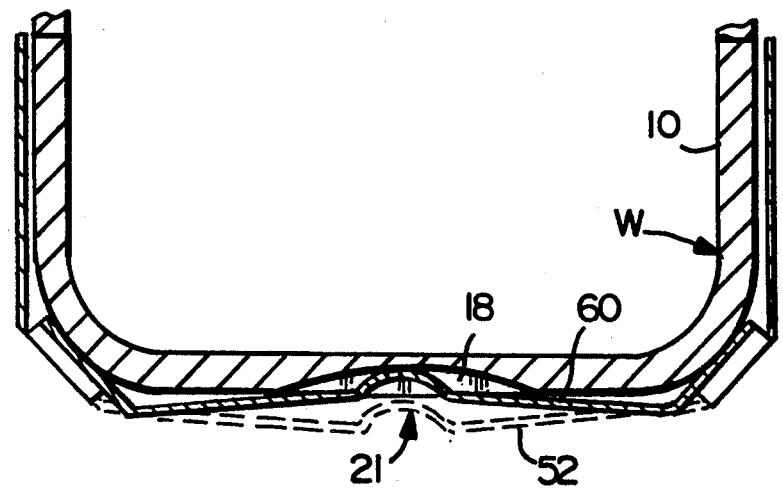
Figure 5A:
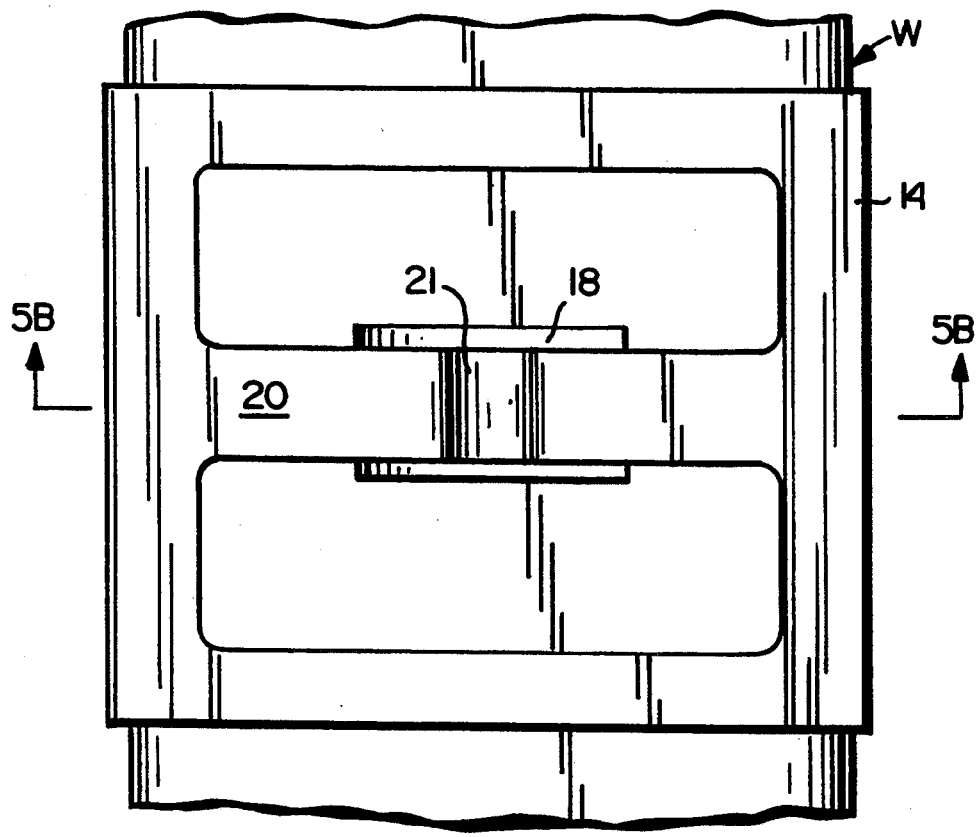

The action of the over center locking spring is illustrated in FIG. 5. FIG. 5A is an elevation view showing spring 20 in front of the locking groove 18. FIG. 5B shows a top view in section at the locking groove. The spring is shown in the locked position 60 and in the unlocked position 52.

Each of the two positions 60 and 52 is a stable position. A moderate applied force will cause the spring to snap from one position to the other.

What is claimed is:

1. In a fuel bundle having:
    upper and lower tie plates;
    a plurality of upstanding fuel rods supported between said tie plates;
    at least one central large water rod extending at least partially between said tie plates; and,
    a plurality of spacers mounted about said large central water rod;
    means for keying said spacers to said large central water rod comprising in combination:
    a groove configured within said large central water rod at an elevation on said water rod to permit said spacer to key to said water rod;
    an inner band fastened to said spacer and surrounding said water rod, said inner band having stop means engaging said water rod;
    an over center spring fastened to said band, said over center spring having a first over center biased position away from said water rod and a second over center biased position in contact with said water rod; and,
    said spring and groove configured for cooperative mating engagement to maintain said spacer at said inner band affixed to said water rod by engagement of said spring with said groove.

2. The invention of claim 1 and further wherein said water rod has a cross sectional shape defining four corners, and wherein said inner band of said spacer includes:
    an upper band member surrounding said water rod;
    a lower band member surrounding said water rod;
    four vertical leg members disposed at said corners of said water rod;
    said stop means including on each of two adjacent said vertical leg members a pair of stops to form four points of contact with two of said corners of said central water rod;
    said stop means further including on each of two remaining adjacent said vertical leg members bent to form springs, a singular stop for biasing said band into contact with said remaining two of said corners of said central water rod.

3. The invention of claim 2 and wherein said over center spring connects between two said vertical leg members.

4. The invention of claim 2 and wherein said over center spring connects between two said vertical leg members each having said paired stops.

* * * * *